United States Patent [19]
Sanchez et al.

[11] Patent Number: 5,659,239
[45] Date of Patent: Aug. 19, 1997

[54] METHOD AND APPARATUS FOR CHARGING SEALED NICKEL-CADMIUM BATTERIES

[75] Inventors: Patrick Sanchez, Le Pian Medoc; Jean-Louis Liska, Bordeaux, both of France

[73] Assignee: Saft, Romainville, France

[21] Appl. No.: 539,756

[22] Filed: Oct. 6, 1995

[30] Foreign Application Priority Data

Oct. 5, 1995 [FR] France ................... 95 11715

[51] Int. Cl.$^6$ ................... H01M 10/44
[52] U.S. Cl. ................... 320/22; 320/30
[58] Field of Search ................... 320/21, 22, 23, 320/24, 29, 30, 35, 36, 39, 48

[56] References Cited

U.S. PATENT DOCUMENTS

| | | | |
|---|---|---|---|
| 3,938,019 | 2/1976 | Schmitt et al. | 320/21 |
| 4,609,861 | 9/1986 | Inaniwa et al. | 320/35 X |
| 4,833,391 | 5/1989 | Thun | 320/23 |
| 4,952,861 | 8/1990 | Horn | 320/23 |
| 5,552,693 | 9/1996 | Nishikawa | 320/22 |

Primary Examiner—Edward Tso
Attorney, Agent, or Firm—Sughrue, Mion, Zinn, Macpeak & Seas

[57] ABSTRACT

A method of charging a sealed nickel-cadmium battery, in which the battery first is charged for a duration $t_1$ at current $I_1$, such that: $I_{min} \leq I_1 \leq I_{max}$ with $0 \leq I_{min} \leq C_1$ and $0.2 C_1 \leq I_{max} \leq 5 C_1$, and $I_1 32 \alpha C_1(1+aT)$ where $0.2 \leq \alpha \leq 5$ and $0 \leq \alpha \leq 0.1$, where T is the temperature and $C_1$ is the nominal current. The battery then is charged at a voltage $U_2$, such that: $U_{min} \leq U_2 \leq U_{max}$ where 1.45 V $\leq U_{min} \leq$ 1.75 V and 1.50 V $\leq U_{max} \leq$ 1.80 V, and $U_2 = U_i + bT$, and a duration $t_2 = \beta t_1 + c$ where $0.2 \leq \beta \leq 5$ and $5 \leq c \leq 60$. Current $I_1$ and voltages $U_1$ and $U_2$ are readjusted as the temperature in the battery changes. Apparatus for performing the inventive method also is provided.

5 Claims, 1 Drawing Sheet

METHOD AND APPARATUS FOR CHARGING SEALED NICKEL-CADMIUM BATTERIES

BACKGROUND OF THE INVENTION

The present invention concerns a method of charging sealed nickel-cadmium Ni-Cd secondary cells, normally assembled in batteries. The invention particularly concerns a method of charging batteries for use as an energy source for ground vehicles or aircraft.

Ni-Cd batteries which are in current use require frequent maintenance. Replacing them with batteries which do not require maintenance would therefore be of interest. However, such batteries must be interchangeable with traditional batteries, in particular as regards their performance on rapid discharge at low temperature and their required cycling speed.

In aviation, these batteries are used in two different ways. Firstly, they are used to start turbines, which can occur several times during a flight, with small discharge depths and at temperatures in the range −40° C. to +60° C. Secondly, they act as a safety measure in the case of a malfunction in the power for an airplane, where discharge depths may be as high as 100% at temperatures in the range −20° C. to +60° C.

On the ground, an electric vehicle must be usable at any time.

These batteries must therefore be permanently capable of carrying out their function, and as a consequence they must always be at least partially charged. Users thus require that batteries are immediately recharged, despite their high temperature, immediately after discharge. In other cases, when batteries are not used for long periods, they are in a partially discharged state and their temperature is that of the surroundings, which can sometimes by very low. Nevertheless, the batteries must be capable of being recharged quickly and efficiently. In addition, in some cases, the time allowed for recharging does not exceed 60 minutes (min).

Complete high rate charging of a Ni-Cd cell is carried out in two stages. In the first stage, the active material in the electrodes is oxidoreduced. When all the active material in the positive electrode has been transformed, the cell passes into an overcharging stage. During this second stage, oxygen is evolved at the positive electrode. Recombination of the oxygen at the negative electrode results in a rise in temperature which has the secondary effect of reducing the voltage in the cell.

Normally, in order to ensure that the cell is fully charged, change in voltage or temperature is monitored and charging is halted after a fixed period once voltage change becomes negative or when the temperature increases. In both these cases, the temperature of the cell is much higher at the end of charging than it was at the beginning. If the battery has to be used within a short period, the temperature has no time to drop. During the following recharge, the temperature of the battery, already very high at the start of charging, increases again. A rapid succession of charging and discharging soon results in a breakdown in the battery, since charging efficiency becomes poor and the charging rate drops with each recharge.

In a sealed cell, with a limited quantity of electrolyte, the presence of air in the cell acts as a thermal insulator and hinders heat evacuation. For vehicle batteries, these problems are aggravated still further for two reasons. The first is based on the fact that these batteries have a high capacity, of more than 10 Ah, and thus the thermal energy they generate is high. The second reason is that cell design does not favor heat evacuation. The container for the cells is formed from plastics material to limit battery weight, and it is a poor heat exchanger. In order to save space, prismatic cells are disposed side-by-side when mounted in a battery, which is particularly unfavorable for heat evacuation.

SUMMARY OF THE INVENTION

The present invention aims to provide a charging method which limits the temperature rise in the battery while permitting a high charge rate.

The present invention thus provides a method of charging a battery of sealed nickel-cadmium cells defined by a nominal capacity, said battery having a variable temperature, the method being characterized in that it comprises at least the two following steps:

a first charging step at applied current $I_1$, in amps, which satisfies the condition: $I_{min} \leq I_1 \leq I_{max}$ where, in amps, $0 \leq I_{min} \leq C_1$ and $0.2\, C_1 \leq I_{max} \leq 5\, C_1$, and has the formula:

$$I_1 = \alpha C_1 (1+aT) \text{ where } 0.2 \leq \alpha \leq 5 \text{ and } 0 \leq a \leq 0.1$$

where T is said temperature in degrees Celsius, the product aT being dimensionless, and where $C_1$ is the current in amps corresponding to discharge of said nominal capacity in one hour, said first step being stopped at the first-satisfied stop criterion selected from a first criterion which is a voltage $U_1$, in volts, which satisfies the condition: $U_{min} \leq U_1 \leq U_{max}$ where 1.45 V $\leq U_{min} \leq$ 1.75 V and 1.50 V $\leq U_{max} \leq$ 1.80 V and has the formula: $U_1 = U_i + bT$ where $-0.005 \leq b \leq 0$ and where $U_i$ is a voltage defined by 1.45 V $\leq U_i \leq$ 1.75 V, and a second criterion which is the rate of change dT/dt of said temperature which is 0.3° C./min±0.2° C./min, said current $I_1$ and said voltage $U_1$ being calculated and readjusted during said first step depending on the change in the temperature of said battery, a second charging step at a voltage $U_2$, in volts, which satisfies the condition: $U_{min} \leq U_2 \leq U_{max}$ where 1.45 V $\leq U_{min} \leq$ 1.75 V and 1.50 V $\leq U_{max} \leq$ 1.80 V and has the formula: $U_2 = U_i + bT$ where $-0.005 \leq b \leq 0$, and at a current $I_2$ in amps which is not greater than 0.2 $C_1$, the duration of said second period $t_2$, in minutes, being determined by the formula:

$$t_2 = \beta t_1 + c \text{ where } 0.2 \leq \beta \leq 5 \text{ and } 5 \text{ min} \leq c \leq 60 \text{ min},$$

where $t_1$ is the duration of said first step, said voltage $U_2$ being calculated and readjusted during said second step depending on the change in the temperature of said battery.

The Ni-Cd cells comprising the battery are said to be sealed, i.e. they include respective safety valves which operate when the internal pressure reaches a few bars. Normally, but not exclusively, these cells are prismatic in shape, each having a container made of plastics material.

When the battery is about to be charged, it is at a temperature which depends on previous events in its history. The current and the stop criterion of the first step are then defined as functions of this temperature. The values of these parameters are then recalculated periodically so that they can be adjusted if the temperature of the battery changes. During the major part of the first step, the temperature of the battery hardly changes and the current remains constant. At the end of the first step the temperature has a tendency to increase, and the values of the stop criteria are thus recalculated. The first step is terminated when one of the stop criteria $U_1$ or dT/dt is reached. In general, the criterion dT/dt is not used when the initial temperature of the battery is less than about 0° C. since the rate of change of the temperature remains moderate even towards the end of charging.

After the first step, the battery is already largely charged, and the second step completes charging. As in the first step, the voltage $U_2$ is correlated to the instantaneous temperature of the battery. The duration of the second step depends both on that of the first step and on the temperature of the battery. This adjustment is intended to ensure complete charging of the battery while minimizing the amount by which it heats up.

Thus whatever the history of the battery, the charge parameters (current, voltage, stop criteria and/or duration) will have been adjusted so that the battery can perform at its best.

In a preferred implementation, the method of the invention also comprises, before the first step, a temperature stabilization step which finishes at a stop criterion which is the rate of change dT/dt of the temperature which is −0.3° C./min±0.2° C./min. This step is important once the initial temperature of the battery becomes positive. The temperature increases at the end of a discharge and it continues to increase for a certain time after discharge is stopped. The charge parameters can be determined validly only when the temperature is no longer varying.

The charging method of the invention has the further advantage of improving the performance of the battery at low temperatures.

The present invention also provides charging apparatus using the method of the invention. In a first embodiment, the apparatus comprises a current and voltage supply;

memory means for memorizing data constituted by the values which the charging parameters must take at said temperature;

measuring means for measuring said temperature and said charging parameters;

comparing means for comparing said charging parameters with said data;

applying means for applying the values which said charging parameters must take.

In a second embodiment, the apparatus comprises a current and voltage supply;

memory means for memorizing the data constituted by the law governing the variation of the charging parameters as a function of said temperature;

calculating means for calculating the values which said charging parameters must take as a function of said temperature;

measuring means for measuring said temperature and said charging parameters;

comparing means for comparing said charging parameters with the value which said charge parameters must take;

applying means for applying the values which said charge parameters must take.

Advantageously, said measuring means, said comparing means, and said applying means can measure, compare and permanently readjust the charging parameters such that at any moment, the charging conditions are the best for the temperature of the battery.

BRIEF DESCRIPTION OF THE DRAWING

The invention will be better understood, and further advantages and features will become apparent, from the following description, given by way of non limiting illustration.

In the accompanying drawing.

DETAILED DESCRIPTION OF THE PREFERRED EMBODIMENTS

Example 1 Prior art

Figure 1:
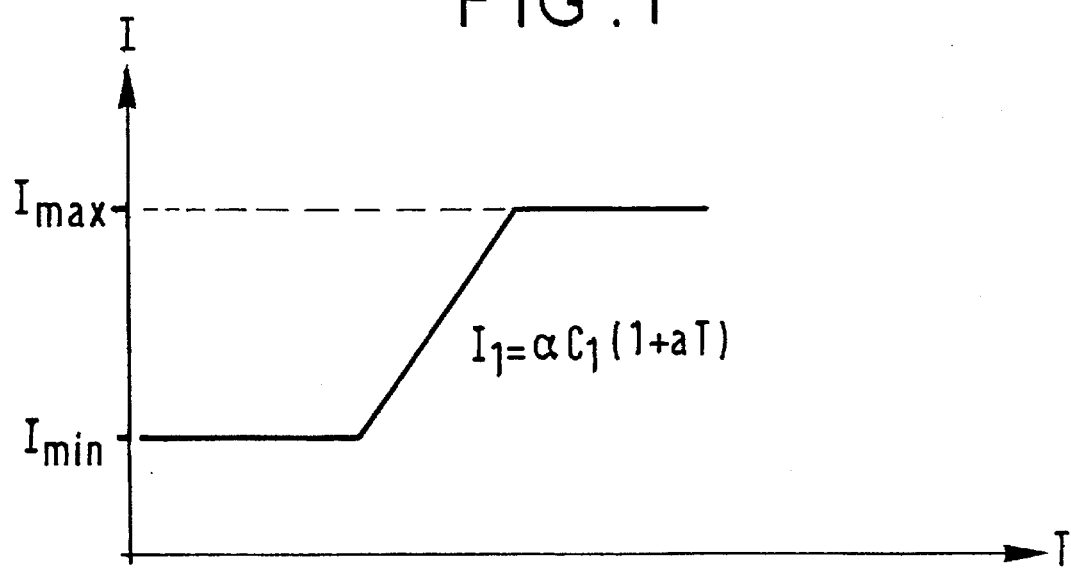
FIG. 1 shows the variation in the charging current $I_1$ of the invention, the temperature T in degrees Celsius being shown as the abscissa and the current I in amps as the ordinate.
Figure 2:
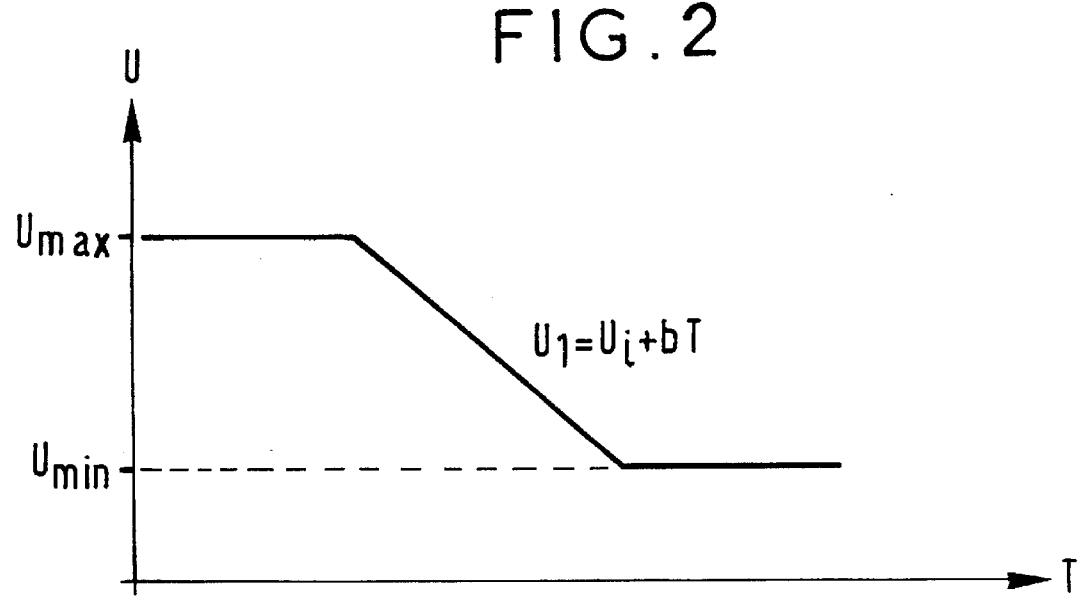
FIG. 2 shows the variation in voltage $U_1$ in accordance with the invention, the temperature T in degrees Celsius being given as the abscissa and voltage U in volts as the ordinate.

A battery B1 comprising 20 sealed nickel-cadmium cells was produced. Each cell was prismatic and comprised a polyamide container provided with a safety valve. The battery had a nominal voltage of 24 V and a nominal capacity of 45 Ah.

Battery B1 was initially discharged to 50% of its nominal capacity and had a temperature of +50° C. It was then charged, using a method which does not form part of the present invention, as follows: charging was carried out at a constant voltage of 30 V for two hours, the charging current being limited to a maximum value of 45 A.

After 20 to 30 minutes of charging, the battery temperature rose sharply and reached 75° C. after 45 minutes. The current remained constant at 45 A for the whole charging period and no reduction was observed therein, as is normal when an open battery of Ni-Cd cells is charged under these conditions.

Charging had to be stopped in order to avoid destroying the battery by heat runaway.

Example 2

A battery B2, analogous to that described in Example 1 was initially discharged to 50% of its nominal capacity and had a temperature of 50° C. It was then charged using the method of the present invention as follows:

the first charging step was started at a current $I_1$ of 45 A; the stop criteria were as follows: voltage $U_1$ of 28.5 V or dT/dt of 0.3° C./min;

the second charging step was carried out at a voltage of 28.4 V for a maximum current $I_2$ set at 9 A.

During the first step, battery temperature T rose from +50° C. to +53° C. The stop voltage $U_2$ was recalculated and fixed at 28.4 V. Criterion dT/dt was reached first after 25 minutes. The first step was then terminated and the second step begun. The duration of this step was calculated and fixed at 30 minutes. The battery was overcharged, the temperature rose to 58° C. During the subsequent discharge, the battery discharged its nominal capacity.

Example 3

A battery B3 comprising 20 sealed nickel-cadmium cells was produced. Each cell was prismatic and comprised a polyamide container provided with a safety valve. The battery had a nominal voltage of 24 V and a nominal capacity of 17 Ah.

The battery was initially discharged to 20% of its nominal capacity and had a temperature of −40° C. It was then charged using the method of the present invention as follows:

the first charging step was started at a current $I'_1$ of 1.7 A; the stop criteria were as follows: voltage $U'_1$ of 32 V or dT/dt of 0.3° C./min;

the second charging step was carried out at a voltage $U'_2$ of 32 V for a maximum current $I'_2$ set at 1.7 A.

During the first step, the battery temperature T rose from −40° C. to −39° C. The stop voltage criterion $U'_2$ was reached first after 60 minutes. The first step was then terminated and the second step begun. The duration of this step was calculated and fixed at 90 minutes. Following charging, the temperature rose to −35° C. After being left at room temperature (+20° C.) for 12 hours, the battery was discharged completely and it discharged its nominal capacity.

The numerical examples are, of course, provided by way of non limiting example. The present invention is not limited to the embodiments described and can be varied by the skilled person without departing from the spirit and scope of the invention.

We claim:

1. A method of charging a battery of sealed nickel-cadmium cells defined by a nominal capacity, said battery having a variable temperature, the method comprising the following steps:

a first step of charging said battery at applied current $I_1$, in amps, wherein said applied current $I_1$ falls between a minimum value $I_{min}$ and a maximum value $I_{max}$ in accordance with the conditions $0 \leq I_{min} \leq C_1$ and $0.2 C_1 \leq I_{max} \leq 5 C_1$, where $C_1$ is the current in amps corresponding to discharge of said nominal capacity in one hour, and $I_1$ satisfies the formula:

$I_1 = \alpha C_1(1+aT)$ where $\alpha$ is a number such that $0.2 \leq \alpha \leq 5$ and a is a coefficient, in units of 1/°C., such that $0 \leq a \leq 0.1$ where T is said temperature in degrees Celsius, the product aT being dimensionless, said first charging step being stopped at the first-satisfied stop criterion selected from a first criterion which is a voltage $U_1$, in volts, which falls between a minimum value $U_{min}$ and a maximum value $U_{max}$ in accordance with the conditions 1.45 V $\leq U_{min} \leq$ 1.75 V and 1.50 V $\leq U_{max} \leq$ 1.80 V and the formula $U_1 = U_i + bT$ where b is a coefficient such that $-0.005 \leq b \leq 0$, and where $U_i$ is a voltage coefficient defined by 1.45 V $\leq U_i \leq$ 1.75 V, and a second criterion which is the rate of change dT/dt of said temperature which is 0.3° C./min±0.2° C./min, said current $I_1$ and said voltage $U_1$ being calculated and readjusted during said first step depending on the change in the temperature of said battery, a second step of charging said battery at a voltage $U_2$, in volts, where $U_2$ falls between said minimum value $U_{min}$ and said maximum value $U_{max}$ in accordance with the conditions 1.45 V $\leq U_{min} \leq$ 1.75 V and 1.50 V $\leq U_{max} \leq$ 1.80 V and has the formula: $U_2 = U_i + bt$ where $-0.005 \leq b \leq 0$, and at a current $I_2$ in amps which is not greater than $0.2 C_1$, the duration of said second period $t_2$, in minutes, being determined by the formula:

$t_2 = \beta t_1 + c$ where $0.2 \leq \beta \leq 5$ and 5 min $\leq c \leq$ 60 min, where $t_1$ is the duration of said first step, said voltage $U_2$ being calculated and readjusted during said second step depending on the change in the temperature of said battery.

2. A method according to claim 1, further comprising, before said first step, a step for stabilizing said temperature which finishes at a stop criterion which is the rate of change dT/dt of said temperature which is 0.3° C./min±0.2° C./min.

3. Apparatus for charging according to claim 1, comprising:

a current and voltage supply;

memory means for memorizing data constituted by the values which the charging parameters must take at said temperature;

measuring means for measuring said temperature and said charging parameters;

comparing means for comparing said charging parameters with said data;

applying means for applying the values which said charging parameters must take.

4. Apparatus for charging according to claim 1, comprising:

a current and voltage supply;

memory means for storing data relating to variation of the charging parameters as a function of said temperature;

calculating means for calculating the values which said charging parameters must take as a function of said temperature;

measuring means for measuring said temperature and said charging parameters;

comparing means for comparing said charging parameters with the value which said charge parameters must take;

applying means for applying the values which said charge parameters must take.

5. Apparatus according to claim 3, in which said measuring means, said comparing means and said applying means are capable of measuring, comparing and permanently readjusting said charging parameters.

* * * * *